United States Patent [19]

Ensign

[11] 4,181,151
[45] Jan. 1, 1980

[54] DIAPHRAGM VALVE

[75] Inventor: Harold W. Ensign, Fullerton, Calif.

[73] Assignee: Cla-Val Co., Costa Mesa, Calif.

[21] Appl. No.: 778,685

[22] Filed: Mar. 17, 1977

[51] Int. Cl.² .............................................. F16K 7/17
[52] U.S. Cl. ................................ 137/625.28; 251/61.1
[58] Field of Search ................ 251/61.1, 331; 137/859, 137/625.28

[56] References Cited

U.S. PATENT DOCUMENTS

| | | |
|---|---|---|
| 365,767 | 6/1887 | Zilles . |
| 963,045 | 7/1910 | Hulse ............................... 251/331 X |
| 1,182,030 | 5/1916 | O'Dowd . |
| 1,496,935 | 6/1924 | Lemmon ........................ 251/331 X |
| 1,722,666 | 7/1929 | Keith . |
| 1,793,396 | 2/1931 | Haentjens . |
| 1,964,921 | 7/1934 | Lundberg . |
| 2,211,212 | 8/1940 | Langdon . |
| 2,307,066 | 1/1943 | Paulus . |
| 2,353,143 | 7/1944 | Bryant . |
| 2,384,420 | 9/1945 | Griswold . |
| 2,394,911 | 2/1946 | Griswold . |
| 2,677,390 | 5/1954 | Davis et al. .................... 251/61.1 X |
| 2,677,390 | 5/1954 | Davis et al. . |
| 2,746,471 | 5/1956 | Cobb . |
| 2,786,642 | 3/1957 | Comb . |
| 2,818,880 | 1/1958 | Ratelband . |
| 2,856,148 | 10/1958 | Heathcote . |
| 2,877,791 | 3/1959 | Rich . |
| 2,885,963 | 5/1959 | Ivanoff . |
| 2,886,281 | 5/1959 | Canalizo . |
| 2,905,431 | 9/1959 | Gilbert . |
| 2,988,103 | 6/1961 | Canvasser . |
| 3,038,488 | 6/1962 | Welch et al. . |
| 3,078,066 | 2/1963 | Moore . |
| 3,092,144 | 6/1963 | Green . |
| 3,217,653 | 11/1965 | Griswold . |
| 3,272,470 | 9/1966 | Bryant . |
| 3,282,556 | 11/1966 | Hancock . |
| 3,306,569 | 2/1967 | Bryant . |
| 3,319,926 | 5/1967 | Boger . |
| 3,468,511 | 9/1969 | Haskins . |
| 3,502,300 | 3/1970 | Harris . |
| 3,520,321 | 7/1970 | Skoli et al. . |
| 3,522,926 | 8/1970 | Bryant et al. . |
| 3,559,676 | 2/1971 | Haskins . |
| 3,585,813 | 6/1971 | Hansen et al. .................... 251/331 X |
| 3,624,801 | 11/1971 | Gannon . |
| 3,690,344 | 9/1972 | Brumm . |
| 3,727,623 | 4/1973 | Robbins . |
| 3,762,681 | 10/1973 | McKinney et al. . |
| 3,782,682 | 1/1974 | Lale . |
| 3,792,720 | 2/1974 | Robbins . |
| 3,856,046 | 12/1974 | Brown et al. . |
| 3,957,395 | 5/1976 | Ensign . |
| 4,044,743 | 8/1977 | Eaton ............................ 251/61.1 X |

FOREIGN PATENT DOCUMENTS 1152583  8/1963  Fed. Rep. of Germany .......... 251/61.1

Primary Examiner—Arnold Rosenthal
Attorney, Agent, or Firm—Gausewitz, Carr & Rothenberg

[57] ABSTRACT

A diaphragm valve includes an apertured diaphragm plate that separates mutually concentric input and output valve chambers. A flexible diaphragm extends somewhat loosely across the plate and seals an operating chamber on one side of the plate. The chamber contains a spring pressed retainer plate having a sealing lip bearing against, but otherwise unsecured to, the diaphragm so that by controlling pressure within the operating chamber, the primary sealing closure is broken and the retainer plate apertures may be progressively blocked or unblocked as the diaphragm moves to and from the diaphragm plate apertures.

14 Claims, 6 Drawing Figures

DIAPHRAGM VALVE

BACKGROUND OF THE INVENTION

The present invention relates to diaphragm valves and more particularly concerns valves particularly useful for modulation at low flow rates and relatively high differential pressures.

In a conventional globe or disc type valve, a valve disc is carried by a movable valve stem toward and away from a valve seat so that flow through the valve can be completely blocked, substantially unobstructed, or controlled to some amount between the two extremes. Generally such a valve is controlled by controlling pressure in an operating chamber which may include a flexible diaphragm connected to the disc stem to operate the stem and valve disc. Valves of this type are made by the Cla-Val Co. of Newport Beach, California, assignee of the present invention, and examples of these are shown in U.S. Pat. Nos. 2,384,420, 3,217,653 and 3,957,395. Such valves, and also many other types of valves, are frequently called upon to provide a low flow rate that may be caused to vary at a high frequency when controlling line pressure fluctuates. Such modulated or varying flow rates, particularly in the presence of high differential pressures, can cause significant problems in valve operation.

If a valve seat and disc are designed so that opening of the valve takes place at the face of the valve seat, the surface over which the flow occurs, high flow velocities and a high pressure drop occur across the face of the seat. Then, if the valve disc operates by changing the opening across the face of the seat, disc movement will be strongly subjected to the high velocity and high pressure drop between the disc and the seat. Therefore, forces are exerted upon the moving valve disc that significantly interfere with low flow rate modulation. The valve may be difficult to accurately control and may be subject to chatter.

Although this problem can be alleviated to some degree by design of the valve disc and seat so that during initial opening of the valve the high pressure drop does not occur across the face of the seat, satisfactory modulation under certain conditions is still not obtainable. Hydraulic forces acting on such a valve will vary with velocity and pressure changes, and under certain conditions forces acting on the valve disc, or upon the diaphragm operator of such disc, are of such magnitude and frequency that the actuating diaphragm (and attached disc) cannot respond fast enough to make the necessary corrections. This is particularly true when such a valve is modulated at low flow rates and relatively high differential pressures, under which conditions there is often experienced pulsation of the valve, chatter, and inability of the valve to control properly.

Diaphragm valves are known in which a diaphragm is secured at its periphery and moved to and from a valve seat for control of the flow through the valve. In one such valve described in the U.S. Pat. No. 2,877,791, to H. G. Rich a flexible diaphragm is stretch-supported and moved between positions in which it opens or closes a number of valve apertures. In this patent the diaphragm is normally tightly stretched into a close fitting engagement. Therefore, its ability to reseat under conditions of a small pressure drop must depend upon resiliency of the diaphragm material and the manner in which it is stretched. Should such a diaphragm become permanently deformed, its sealing ability will deteriorate.

In the U.S. Pat. No. 3,078,066 to R. P. Moore and the counterpart West German Pat. No. 1,152,583 to the same inventor, there is shown a valve in which the diaphragm is secured at its periphery and is also secured at a central portion thereof to a series of washerlike elements that sandwich and rigidify the mid-portion of the diaphragm therebetween The diaphragm is further stiffened by wire loops or a copper disc embedded in rubber. These patents to Moore provide a diaphragm that moves as a unitary device, operating much like a rigid poppet type valve or disc, in that the entire operating portion of the diaphragm assembly will move to and from the supporting plate as a single unit. In such an operation, all of the orifices may open together. Therefore, this arrangement will have much the same modulation control problems as does a valve with a rigid poppet or disc. When this valve is opened by a small amount, flow velocity and pressure drop is across the face of the supporting disc between the facing surfaces of the diaphragm and its supporting disc, and thus such pressure drop and velocity exert forces upon the rigidified diaphragm that tend to change the selected controlling forces and thus to change the operation, inducing problems such as pulsations, downstream pressure and chattering.

Accordingly, it is an object of the present invention to provide a diaphragm valve that avoids or minimizes the above-mentioned problems.

SUMMARY OF THE INVENTION

In carrying out principles of the present invention in accordance with a preferred embodiment thereof, a valve body is provided with a diaphragm plate extending between input and output flow chambers and the plate is provided with passage means that provide fluid communication between the flow chambers. Fow control means are provided for progressively blocking and unblocking successive portions of the passage means, such flow control means comprising a diaphragm that is mounted for loose flexing motion in a pattern of contact with the diaphragm plate that progresses and retrogresses along the diaphragm plate. Within the operating chamber and in contact with the diaphragm, but otherwise free of connection therewith and restraint thereupon, is a retainer plate substantially coextensive with one of the flow chambers. The retainer plate and the adjacent section of the diaphragm, although resiliently urged toward closed position, are free of other restraint upon their motion. With this arrangement, the total collective area of the diaphragm plate passages is not opened all at once as with prior poppet valves or with diaphragm valves in which the diaphragm moves as a unitary assembly, but rather, the total area of opening is progressively enlarged or diminished as the loose diaphragm flexes away from or toward the diaphragm plate. Thus it is not necessary, in order to maintain a condition of low flow rate, to hold the movable member close to the aperture or seat and thus obtain a high flow velocity and pressure drop thereacross that tends to displace the movable member from its commanded position. The motion of the diaphragm along the diaphragm plate allows a condition of low flow rate in which less than all of the apertures are uncovered. Further, the arrangement provides a movable closure (the combination of diaphragm, retainer and spring) having a relatively small mass and thus capable of a more rapid response and a higher frequency of modulation.

According to another feature of the invention, the diaphragm plate includes an annular sealing edge circumscribing the inner periphery thereof and the retainer plate includes an annular lip that cooperates with the sealing edge to press the diaphragm firmly therebetween for improved sealing.

DETAILED DESCRIPTION

Figure 1:
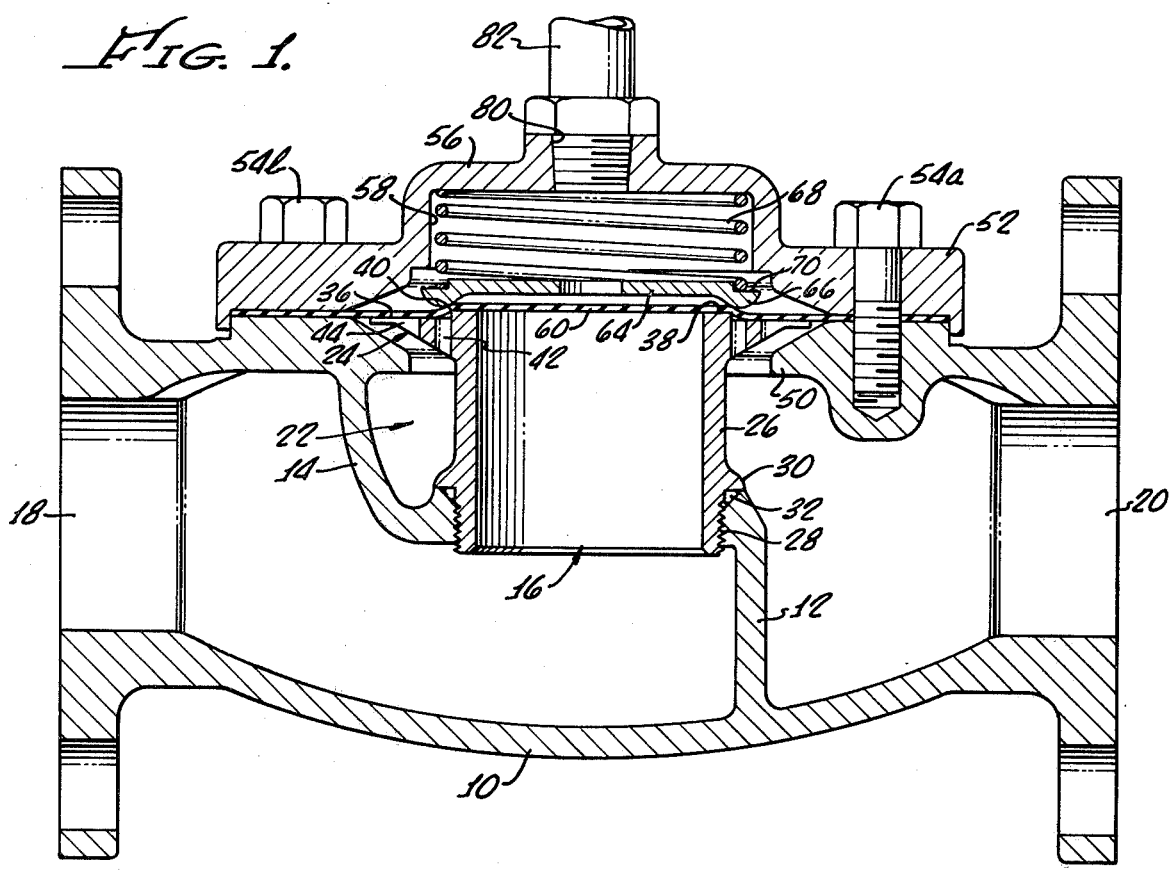
FIG. 1 shows a cross-section of a diaphragm valve embodying principles of the present invention.

As illustrated in FIG. 1, a diaphragm valve embodying principles of the present invention incorporates a conventional valve body 10 having a seat support formed by an internal member 12, 14, defining a circular passage 16 which provides for flow from the valve inlet 18 to the valve outlet 20. The circular edge of seat support member 12, 14, which circumscribes the circular passage 16, is internally threaded for reception of the valve closure mechanism. The described valve body is conventional and substantially similar to the valve bodies described in U.S. Pat. Nos. 2,384,420, 3,217,653 and 3,957,395 and other similar valves of the "Hytrol" type made by the Cla-Val Co. In such prior valves, the seat support 12, 14 receives a threaded valve seat which cooperates with a rigid valve disc carried on a fixed spool that is guided for vertical motion and driven by an operating diaphragm.

Figure 2:
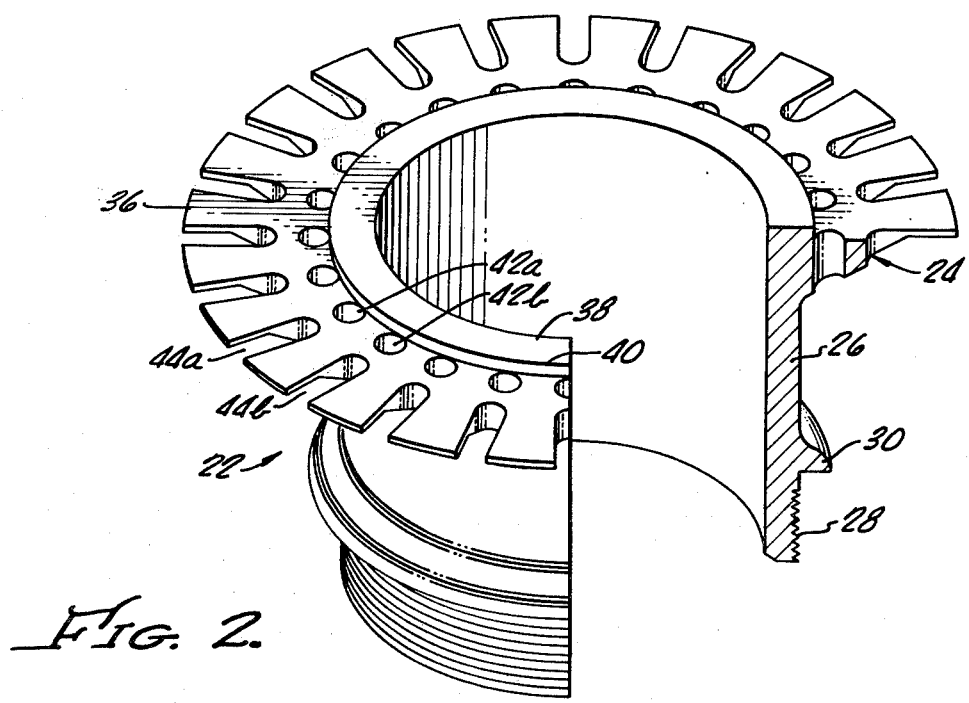
FIG. 2 is an enlarged perspective view of the diaphragm plate and its hollow trunk, with parts broken away.

In accordance with the present invention, the prior closure mechanism that cooperates with this valve seat support is replaced by a diaphragm closure assembly that comprises a diaphragm support plate 22 having an annular flange or plate section 24 carried by a hollow central trunk 26 (FIG. 2). Trunk 26 is externally threaded at its lower end, as at 28, and threadedly engaged with the threads on seat support element 12, 14 to thereby fixedly mount the diaphragm plate to the seat support. Trunk 26 includes a peripheral shoulder 30 having a lower surface that seats firmly at the annular upper edge of support 12, 14, with a sealing O-ring 32 captured between the shoulder 30 and an inner chamfered upper edge of the annular support 12, 14.

Integrally formed with and circumscribing trunk 26 is the annular plate section 24 having a planar upper surface 36 that is slightly below the plane of the upper edge 38 of trunk 26 to thereby define a raised annular sealing edge 40. A pattern of flow passages is formed in annular plate section 24, and in a presently preferred form of the invention, comprises a group of passages formed in a circular path extending around the diaphragm plate. Thus each aperture of a first circular row of apertures 42a, 42b, etc., extends entirely through the annular plate, just outside of the trunk 26. Each of a plurality of radially extending slots 44a, 44b, etc., extends through the plate from the outer edge thereof inwardly toward, but short of, the circular row 42a, 42b, etc.

The conventional valve body includes an outer opening formed by a tapered circular shoulder 50 (FIG. 1). The diameter of diaphragm plate 22 is slightly less than the diameter of the opening formed by shoulder 50 at a point adjacent the outer edge of the diaphragm plate. This enables the trunk of the latter to be threaded into and tightly seated upon the seat support 12, 14 without contact between the annular plate section 36 and the valve body shoulder 50.

A valve cover 52 is fixedly secured to the valve body by means of a circular row of bolts 54a, 54b, etc., extending through the cover and threadedly engaged in the valve body. The cover includes a raised central section 56 that forms fixed wall sections of an operating chamber 58 which is adapted to be subjected to a controlled pressure for operation of the valve.

The operating chamber is sealed by a diaphragm 60 that forms the movable closure member of this valve. Diaphragm 60 is a flexible member formed of a flat sheet of conventional diaphragm material and is merely cut out to the desired configuration, which is circular in this illustration. Conventional diaphragm material suitable for this purpose comprises a rubber impregnated nylon fabric sandwiched between and bonded to a pair of flexible rubber layers and having a total thickness of approximately ⅛th of an inch. No preforming or preshaping of this diaphragm member is needed or employed. No rigid or semi-rigid reinforcing or stiffening is needed and, indeed, it is preferred that the diaphragm have a high degree of flexibility.

However, it is highly desirable, in the practice of this invention, that the diaphragm be dimensioned so that it includes loose or extra material within its secured periphery. Thus the diaphragm, which is circular in configuration in the illustrative embodiment, has formed therein a circle of bolt holes to receive the bolts 54a and 54b which secure both the cover and the diaphragm to the valve body, the outer periphery of the diaphragm being interposed between and securely clamped by the cover 52 and valve body shoulder 50. In order to obtain the excess of material within the confined periphery of the diaphragm, the circle of bolt holes formed in the diaphragm is made with a diameter slightly greater than the diameter of the circle of bolt holes formed in the cover and valve body. Thus material of the diaphragm is slightly bunched or in excess within the circle of bolt holes. This excess material, the diaphragm's flexibility and its freedom from constraint or connection to other valve parts except at its periphery (as will be described below), all cooperate to achieve a loose flexing motion of the diaphragm in a progressive and retrogressive pattern of contact along the diaphragm plate.

Resting upon, but otherwise totally free of attachment to the diaphragm, is a spring retainer plate 64 having a depending peripheral lip 66 in registry with the peripheral circular sealing edge 40 of the diaphragm plate. Thus, with the diaphragm interposed between the retainer plate and the diaphragm plate, the depending lip 66 may press the diaphragm against the sealing edge to provide a more efficient seal which is particularly useful in obtaining a drip tight seal with minimum closing pressure.

A spring 68 is mounted within the operating chamber 58, resting at its lower end upon an annular outer ledge 70 of the retainer plate, just above the lip 66, and pressing at its upper end against the inner surface of the raised portion 56 of the cover.

The spring diameter is relatively large, substantially equal to the diameter of the retainer plate and greater than the diameter of the inner periphery of the diaphragm plate. This enables use of a spring with a lower spring rate which requires relatively less force to be fully compressed (full open). A smaller spring, must necessarily have a higher spring rate to provide the same amount of initial opening force and, therefore, will provide a high resistance to full valve opening.

Figure 3:
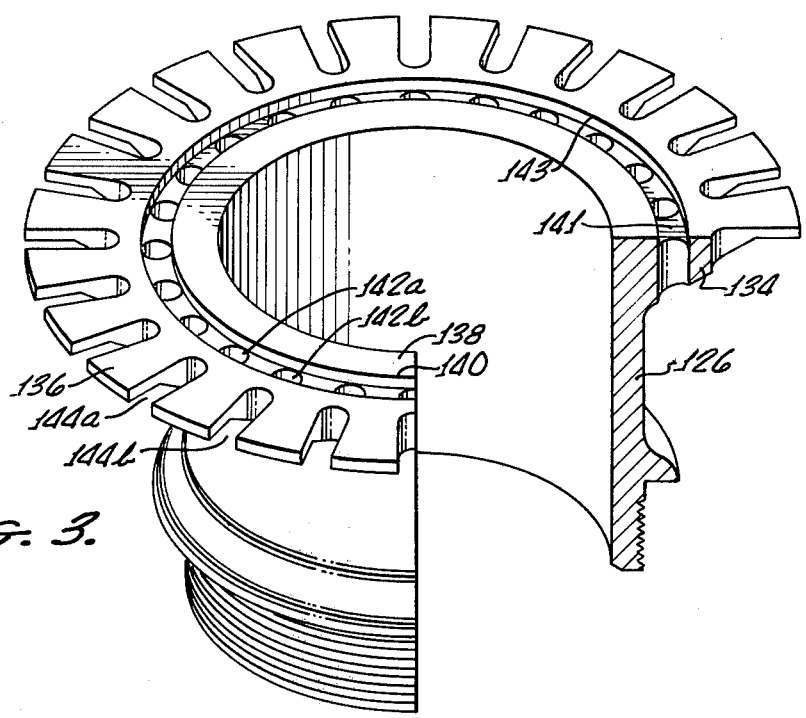
FIG. 3 is a perspective view of a modified diaphragm plate, with parts broken away.

It will be readily appreciated that many different configurations of the diaphragm plate and the pattern of apertures therein may be employed. FIG. 3 illustrates a slightly modified diaphragm plate in which the annular plate section 134 has its upper surface 136 coplanar with the upper edge 138 of diaphragm plate trunk 126. The plate is provided with a similar circular row of apertures 142a, 142b, etc., and radial slots 144a, 144b. In this arrangement a continuous peripheral sealing edge 140 is provided by a continuous annular groove 141 formed in the upper surface of the plate section 134 and overlying the circular pattern of apertures 142a, 142b. The use of the groove, rather than the depressed surface or raised trunk section edge provides enhanced sealing by presenting two edges of the groove for registration with the depending lip 66 of the retainer plate. Thus, in addition to sealing edge 140 upon the inner periphery of groove 141, a second sealing edge 143 is provided on the outer periphery of this groove. The lip 66 is positioned and configured to urge the interposed diaphragm downwardly into the groove 141 to be pressed against both edges 140 and 143. Thus the nadir of the retainer plate lip is positioned substantially midway between edges 140, 143 so that its oppositely inclined surfaces are in registry with both of the sealing edges.

Figure 4:
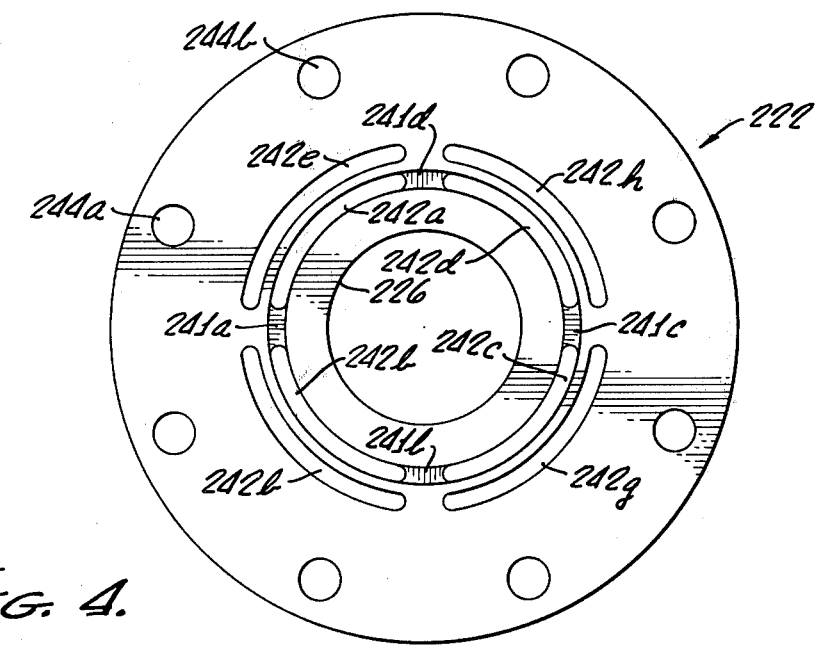
FIG. 4 is a plan view of still another modification of a diaphragm plate.

Illustrated in FIG. 4 is a plan view of a diaphragm plate having a modified pattern of apertures therein but otherwise similar to the previously described diaphragm plates. The diaphragm plate 222 of FIG. 4 is formed with first and second rows of arcuate circumferentially extending elongated apertures 242a, 242b, 242c, 242d, 242e, 242f, 242g and 242h, the two rows being mutually concentric and positioned relatively close to the plate trunk 226. In addition, an outer circular row of apertures 244a, 244b, etc., is provided. Radial slots may be substituted for the apertures 244a, 244b. Preferably the arcuate apertures 242a, b, c, and d of the inner row are interconnected by surface grooves 241a, 241b, 241c and 241d, to provide a continuous groove that presents a pair of sealing edges equivalent to sealing edges 140 and 143 of FIG. 4 to the depending lip of the retainer plate.

With the flow direction indicated, the diaphragm may be entirely unsupported over the relatively large diameter of the interior of the diaphragm plate trunk section. Closing forces exerted on the diaphragm by the operating chamber pressure tend to force the diaphragm down upon the annular section of the diaphragm plate and thus it is preferred that the apertures in all of the described diaphragm plates have at least one dimension that is not greater than twice the thickness of the diaphragm in order to prevent extrusion of the diaphragm into the apertures.

Figure 5:
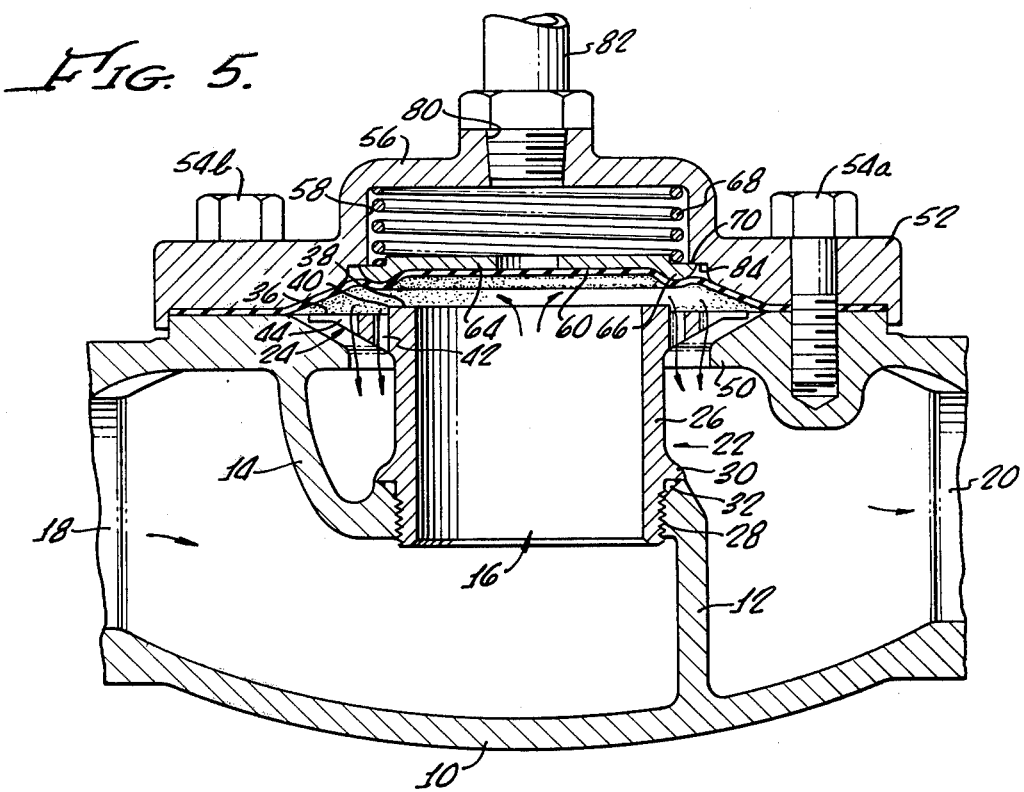
FIG. 5 is a sectional view similar to the view of FIG. 1, but showing the valve in full open position.

Valve cover 52 is provided with an aperture 80 to which a suitable fitting may be connected to control pressure within the operating chamber 58. Such a fitting 82 may be connected by means, not shown, to alternatively provide atmospheric or a higher pressure to the operating chamber. When the operating chamber is vented to the atmosphere, upstream pressure via inlet 18 is presented to the valve input chamber at the lower side of the diaphragm and within the diaphragm plate trunk. This pressure, which is greater than atmospheric pressure, will force the diaphragm upwardly against the action of the spring to the open position of the valve, as shown in FIG. 5.

The open position is limited by abutment of the retainer plate ledge 70 with a mating shoulder 84 formed on the cover. The diaphragm is pressed upwardly against and supported by the lower surface of the retainer plate and fluid flows, as indicated by the arrows, from the valve inlet chamber, through the valve diaphragm plate trunk, through the apertures of the plate, and into the downstream or valve outlet chamber. To close the valve, the operating chamber is merely connected to a suitable of higher pressure such as, for example, the upstream pressure of fluid connected to the upstream end of the valve. Of course, other pressure sources independent of the fluid pressure controlled by the valve, may be employed if necessary or desirable.

The valve will operate as indicated even if the retainer plate 64 and spring 68 are omitted. However, in such a configuration, the valve may be slow in closing under certain conditions, particularly where upstream fluid pressure is conveyed to the operating chamber for closing the valve and relatively small differential pressures are exerted across the diaphragm. To enhance the closing under such conditions, the spring is provided (which always exerts a closing force upon the diaphragm). The retainer plate is interposed between the spring and the diaphragm. Among its several functions it minimizes wear on the diaphragm and cooperates with the diaphragm plate sealing edge for enhanced sealing.

Figure 6:
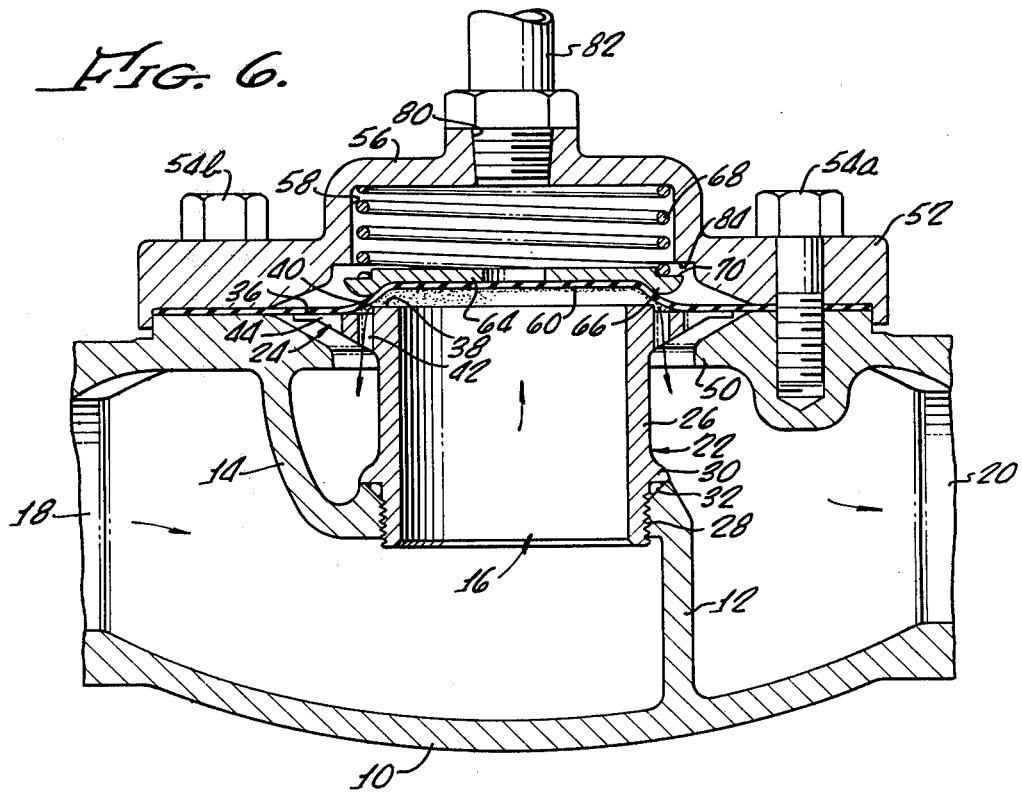
FIG. 6 is a sectional view illustrating the position of the diaphragm and retainer plate in a condition of low flow rates through the valve.

The retainer plate is centrally apertured to allow fluid in the operating chamber to flow into the space between the diaphragm and the inner surface of the retainer plate, whereby, at least in the fully closed position, as illustrated in FIG. 1, the diaphragm is spaced from and below the central section of the retainer plate, which is displaced from the plane of the sealing lip 66 away from the diaphragm. Further, it is to be noted that none of the diaphragm, retainer plate, or spring, are guided for vertical motion (axially of the diaphragm plate) and none of these are connected to any other so that the diaphragm and retainer plate are free to move with a tilting action. Thus the diaphragm and retainer plate do not move axially of the diaphragm plate as a unit. Particularly with the diaphragm being spaced from the raised central section of the retainer plate, as illustrated in the closed position of FIG. 1, the diaphragm, partly by virtue of the excess material provided therein, is free to move from its contact with the sealing edge 40 by a flexing motion in a circular path around the circular row of apertures. The diaphragm will not lift off of all of the apertures at the same time in a single unitary vertical motion. The opening of this valve occurs by a progressive blocking and unblocking of successive portions of the diaphragm plate passages as the diaphragm bends at progressively different circular areas thereof. The flexing of the diaphragm provides a motion in a pattern of contact with the diaphragm plate that progresses and retrogresses along the diaphragm plate. As can be seen in the partly open position of FIG. 6, the raised central section of the retainer plate allows the diaphragm to bend at the lip 66 and to incline upwardly from sealing contact with an outer portion of the diaphragm plate to a position displaced from an inner portion thereof. As the valve opens more or less, the area of sealing contact progresses outwardly or inwardly along the annular plate section 24.

This progressive contact is facilitated and enhanced by a number of features of the described valve, including the freedom of restraint and connection of the diaphragm (except at its periphery), the diaphragm flexibility, the excess diaphragm material, the size of the retainer plate, the depending retainer plate lip, and the raised central section of the retainer plate. Thus the retainer plate assists in rapid closing (in cooperation with the spring) and affords tighter sealing, yet does not interfere with (and actually guides) the loose flexing of the diaphragm to provide a progressive and retrogressive opening and closing contact.

With this type of diaphragm motion, the problem of opening all apertures at one time is avoided and thus pulsations and chattering, particularly at low flow rates, when the valve is opened only a small amount, are substantially minimized.

The foregoing detailed description is to be clearly understood as given by way of illustration and example only, the spirit and scope of this invention being limited solely by the appended claims.

What is claimed is:

1. A diaphragm valve comprising
   a valve body,
   a plate support in said body,
   a diaphragm plate formed with a plurality of passages and having a hollow trunk mounted on said support and separating said valve body into input and output chambers, one of said chambers including a portion within said trunk and the other of said chambers including a portion exterior to said trunk,
   a valve cover connected to said body on one side of said plate to define therewith an operation chamber,
   a diaphragm having its outer periphery fixed to said body and extending across said chamber and across said diaphragm plate, said diaphragm having portions adjacent said passages that are flexible and relatively unrestrained whereby such diaphragm portions may flex to peel from said diaphragm plate passages to progressively cover or uncover more area of said passages as more of said diaphragm is displaced from or toward said passages,
   a retainer plate having a diameter at least equal to the diameter of said hollow trunk, said retainer plate being positioned in said operating chamber between said cover and diaphragm and in contact with said diaphragm, and
   means for urging said retainer plate toward said diaphragm plate, said diaphragm being fixed at points at its periphery corresponding to points of said valve body, said points of said diaphragm being spaced from one another by greater distances than said points of said valve body whereby the diaphragm is free to bend at various portions thereof without stretching, said diaphragm being free of attachment except at its periphery.

2. The valve of claim 1 wherein said retainer plate is free of connection to said diaphragm.

3. The valve of claim 1 wherein said diaphragm plate passages comprises a plurality of circumferentially spaced arcuate slots.

4. A diaphragm valve comprising
   a valve body,
   a plate support in said body,
   a diaphragm plate formed with a plurality of passages and having a hollow trunk mounted on said support and separating said valve body into input and output chambers, one of said chambers including a portion within said trunk and the other of said chambers including a portion exterior to said trunk,
   a valve cover connected to said body on one side of said plate to define therewith an operating chamber,
   a diaphragm having its outer periphery fixed to said body and extending across said chamber and across said diaphragm plate,
   a retainer plate having a diameter at least equal to the diameter of said hollow trunk, said retainer plate being positioned in said operating chamber between said cover and diaphragm and in contact with said diaphragm,
   means for urging said retainer plate toward said diaphragm plate,
   said diaphragm plate including a continuous annular sealing edge circumscribing said trunk, said retainer plate including a continuous annular lip projecting toward and in registry with said sealing edge to provide a primary seal between said diaphragm and said diaphragm plate,
   said diaphragm plate passages comprising a plurality of circumferentially spaced slots extending radially inwardly from the periphery of said diaphragm plate and cooperating with said diaphragm to provide a progressive secondary seal between said diaphragm and said diaphragm plate.

5. A diaphragm valve comprising:
   a valve body having input and output flow chambers,
   a diaphragm plate fixed to said body and extending between said flow chambers, said plate having a plurality of circumferentially spaced passage means having radially spaced portions providing fluid communication between said flow chambers,
   means for defining an operating chamber at one side of said plate,
   a retainer plate in said operating chamber extending across at least one of said flow chambers, and
   a flexible diaphragm extending across said operating chamber between said retainer and diaphragm plates, said diaphragm being fixed at points at the periphery thereof to corresponding points of said valve body, said points of said diaphragm being spaced from one another by greater distances than said points of said valve body are spaced from one another, whereby said diaphragm extends loosely across said operating chamber, said diaphragm being free of attachment to said retainer plate, said diaphragm including loose flexible portions overlying said passage means and having sufficient flexibility and freedom of motion to peel from said diaphragm plate and progressively unblock or block more of the total opening area of said passage means portions as said diaphragm progressively flexes away from or toward said diaphragm plate.

6. A diaphragm valve comprising
   a valve body having input and output flow chambers of which one is positioned within the other,
   a diaphragm plate fixed to said body and extending between said flow chambers, said plate having a plurality of passages providing fluid communication between said flow chambers, means for defining an operating chamber at one side of said plate, a retainer plate in said operating chamber extending across at least one of said flow chambers, a flexible diaphragm extending across said operating chamber between said retainer and diaphragm plates, said diaphragm being fixed at points at the periphery thereof to corresponding points of said valve body, said points of said diaphragm being spaced from one another by greater distances than said points of said valve body are spaced from one another, whereby said diaphragm extends loosely across said operating chamber, said diaphragm being free of attachment to said retainer plate, and said diaphragm plate having an inner periphery and said retainer plate including an annular sealing lip in registry with said inner periphery of said diaphragm plate, whereby said diaphragm may be pressed by said lip against said inner periphery to provide a primary seal between said diaphragm and said diaphragm plate.

7. The valve of claim 5 including means for urging said retainer plate toward said diaphragm plate, said means comprising a spring in said operating chamber having a diameter substantially equal to the diameter of said retainer plate.

8. A diaphragm valve comprising a valve body having input and output flow chambers of which one is positioned within the other, a diaphragm plate fixed to said body and extending between said flow chambers, said plate having a plurality of passages providing fluid communication between said flow chambers, means for defining an operating chamber at one side of said plate, a retainer plate in said operating chamber extending across at least one of said flow chambers, a flexible diaphragm extending across said operating chamber between said retainer and diaphragm plates, said diaphragm being fixed at points at the periphery thereof to corresponding points of said valve body, said points of said diaphragm being spaced from one another by greater distances than said points of said valve body are spaced from one another, whereby said diaphragm extends loosely across said operating chamber, said diaphragm being free of attachment to said retainer plate, and said retainer plate including a continuous annular lip and a central section displaced from the plane of said lip away from said diaphragm said diaphragm plate including a substantially flat face having a continuous annular sealing edge projecting toward said diaphragm and registering with said retainer plate lip, whereby said retainer plate may be urged toward said diaphragm plate and said lip will press and seal said diaphragm against said sealing edge.

9. A diaphragm valve comprising a valve body having input and output flow chambers of which one is positioned within the other, a diaphragm plate fixed to said body and extending between said flow chambers, said plate having a plurality of passages providing fluid communication between said flow chambers, means for defining an operating chamber at one side of said plate, a retainer plate in said operating chamber extending across at least one of said flow chambers, a flexible diaphragm extending across said operating chamber between said retainer and diaphragm plates, said diaphragm being fixed at points at the periphery thereof to corresponding points of said valve body, said points of said diaphragm being spaced from one another by greater distances than said points of said valve body are spaced from one another, whereby said diaphragm extends loosely across said operating chamber, said diaphragm being free of attachment to said retainer plate, said retainer plate having an aperture therethrough to provide fluid communication between said operating chamber and mutually facing adjacent surfaces of said retainer plate and diaphragm.

10. A diaphragm valve comprising a valve body having input and output flow chambers of which one is positioned within the other, a diaphragm plate fixed to said body and extending between said flow chambers, said plate having a plurality of passages providing fluid communication between said flow chambers, means for defining an operating chamber at one side of said plate, a retainer plate in said operating chamber extending across at least one of said flow chambers, a flexible diaphragm extending across said operating chamber between said retainer and diaphragm plates, said diaphragm being fixed at points at the periphery thereof to corresponding points of said valve body, said points of said diaphragm being spaced from one another by greater distances than said points of said valve body are spaced from one another, whereby said diaphragm extends loosely across said operating chamber, said diaphragm being free of attachment to said retainer plate, said diaphragm plate being annular and including a hollow trunk projecting axially thereof and separating said flow chambers from each other, one end of said trunk being secured to said valve body, the other end of said trunk defining the inner periphery of said diaphragm plate, said retainer plate including a peripheral lip cooperating with said other end of said trunk to seal said diaphragm therebetween.

11. A diaphragm valve comprising a valve body having input and output flow chambers of which one is positioned within the other, a diaphragm plate fixed to said body and extending between said flow chambers, said plate having a plurality of passages providing fluid communication between said flow chambers, means for defining an operating chamber at one side of said plate, a retainer plate in said operating chamber extending across at least one of said flow chambers, a flexible diaphragm extending across said operating chamber between said retainer and diaphragm plates, said diaphragm being fixed at points at the periphery thereof to corresponding points of said valve body, said points of said diaphragm being spaced from one another by greater distances than said points of said valve body are spaced from one another, whereby said diaphragm extends loosely across said operating chamber, said diaphragm being free of attachment to said retainer plate, said diaphragm plate including an inner annular sealing portion projecting outwardly from the plane of such plate beyond an adjacent annular portion, and said retainer plate including an annular sealing lip projecting therefrom and cooperating with said annular portion to seal said diaphragm therebetween when said valve is closed.

12. The valve of claim 5 wherein said diaphragm plate has a substantially planar surface for contact with said diaphragm, said surface having an annular sealing edge adjacent an inner periphery thereof for cooperating with said retainer plate to seal said diaphragm therebetween.

13. A diaphragm valve comprising a valve body, a plate support in said body, a diaphragm plate formed with a plurality of passage means and having a hollow trunk mounted on said support and separating said valve body into input and output chambers, one of said chambers including a portion within said trunk and the other of said chambers including a portion exterior to said trunk, said passage means comprising a plurality of circumferentially spaced passages having radially spaced portions extending inwardly from the periphery of said plate, a valve cover connected to said body on one side of said plate to define therewith an operating chamber, flow control means for progressively blocking and unblocking successive portions of said passages, said flow control means comprising a loosely mounted flexible diaphragm having its outer periphery fixed to said body and extending across said chamber and across said diaphragm plate, said diaphragm being mounted for loose flexing motion in a pattern of contact with said plate that progresses and retrogresses along said plate and passages whereby the total area of the opening of said passages is enlarged or diminished as the diaphragm progressively flexes away from or toward said plate, a retainer plate having a diameter at least equal to the diameter of said hollow trunk, said retainer plate being positioned in said operating chamber between said cover and diaphragm and in contact with said diaphragm, and means for urging said retainer plate toward said diaphragm plate.

14. The vlave of claim 13 wherein said operating chamber is sealed said diaphragm forming a wall of said operating chamber, and means for controlling pressure within said operating chamber for flexibly moving said diaphragm toward or away from said diaphragm plate.

* * * * *